US007813104B2

(12) United States Patent
Nakano et al.

(10) Patent No.: US 7,813,104 B2
(45) Date of Patent: Oct. 12, 2010

(54) CERAMIC ELEMENT

(75) Inventors: Mutsuko Nakano, Tokyo (JP); Kyoji Koseki, Tokyo (JP); Hisashi Aiba, Tokyo (JP); Yukihiro Murakami, Tokyo (JP); Kazuto Takeya, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/359,466

(22) Filed: Jan. 26, 2009

(65) Prior Publication Data

US 2009/0191418 A1 Jul. 30, 2009

(30) Foreign Application Priority Data

Jan. 28, 2008 (JP) ............................. 2008-016637

(51) Int. Cl.
*H01G 4/00* (2006.01)

(52) U.S. Cl. .................... 361/301.4; 361/312; 361/320; 361/321.1; 361/321.2; 361/321.3; 361/321.4; 361/321.5

(58) Field of Classification Search .............. 361/301.4, 361/311–312, 320, 321.1–321.5, 31.4
See application file for complete search history.

(56) References Cited

FOREIGN PATENT DOCUMENTS

| | | | |
|---|---|---|---|
| JP | A-03-006801 | | 1/1991 |
| JP | 05-047513 | * | 9/1993 |
| JP | A-5-251210 | | 9/1993 |
| JP | A-08-022901 | | 1/1996 |
| JP | A-11-219804 | | 8/1999 |
| JP | 11-251120 | * | 9/1999 |
| JP | A-2003-272906 | | 9/2003 |
| JP | A-2007-242995 | | 9/2007 |

* cited by examiner

*Primary Examiner*—Cathy Lam
(74) *Attorney, Agent, or Firm*—Oliff & Berridge, PLC

(57) ABSTRACT

A ceramic element, including: a ceramic body having an internal electrode layer and a ceramic layer; an external electrode having a base electrode which is provided on the outside of the ceramic body so as to be electrically connected with the internal electrode layer, and a plating layer covering the outer surface of the base electrode; and a protective layer for covering at least a portion of the outer surface of the ceramic layer other than the portion covered by the external electrode, wherein the protective layer includes a first layer that is an insulating layer containing an insulating oxide, and a second layer that is an insulating layer containing the same insulating oxide as the first layer and an element that is the same as at least one of elements forming the ceramic layer, and the first layer and second layer are formed in that order from the inside.

4 Claims, 6 Drawing Sheets

CERAMIC ELEMENT

BACKGROUND OF THE INVENTION

1. Field of the Invention

The present invention relates to a ceramic element,

2. Related Background Art

Ceramic elements such as varistors, thermistors, and inductors are composed of a ceramic body having an internal electrode layer and ceramic layer, and an external electrode that is provided so as to be electrically connected to the internal electrode layer. Ceramic elements having the above structure are often fixed and connected by soldering the external electrode to a printed circuit board or the like. However, unmodified conventional external electrodes tend to melt from the solder heat and diffuse into the solder, which tends to result in poor connections. The solder heat resistance of external electrodes has conventionally been improved through a structure having a base electrode and a plating layer of Ni or the like formed on the surface thereof. In the interests of manufacturing costs and the like, such plating layers are generally formed by electroplating.

However, if the ceramic layer does not have enough insulation resistance, the plating layer may sometimes spread out of the area where the base electrode is to be formed (plating spread), or parts other than the base electrode may become plated (plating adhesion), during the electroplating process. These phenomena are considered problems which can cause external electrode shorts.

A method that has been developed to prevent such "plating spread" and "plating adhesion" during the electroplating process is to coat the surface of the ceramic body with a glass layer and oxide layer (or insulating layer) prior to the plating process (see JP-A 2007-242995).

SUMMARY OF THE INVENTION

However, the increasingly smaller sizes of recent ceramic elements have been accompanied by more and more demand for techniques to prevent external electrode shorts, and it is becoming more and more difficult to meet such demand using conventional methods. The method described in JP-A 2007-242995, for example, is not effective enough in preventing plating spread or plating adhesion which can cause external electrode shorts.

It is therefore an object of the present invention to provide a ceramic element in which plating spread and plating adhesion which can cause external electrode shorts are controlled.

The present invention is a ceramic element, including: a ceramic body having an internal electrode layer and a ceramic layer; an external electrode having a base electrode which is provided on the outside of the ceramic body so as to be electrically connected with the internal electrode layer, and a plating layer covering the outer surface of the base electrode; and a protective layer for covering at least a portion of the outer surface of the ceramic layer other than the portion covered by the external electrode, wherein the protective layer includes a first layer that is an insulating layer containing an insulating oxide, and a second layer that is an insulating layer containing the same insulating oxide as the first layer and an element that is the same as at least one of elements forming the ceramic layer, and the first layer and second layer are formed in that order from the inside.

The protective layer has the specific structure noted above and can thereby adequately prevent plating spread and plating adhesion during the plating process. Plating spread and plating adhesion are therefore controlled in the ceramic element of the present invention, and external electrode shorts are less likely to occur. The protective layer having the structure noted above is also less likely to become detached from the ceramic body and can therefore prevent a loss of surface insulation resistance in the ceramic element which may happen if the flux contained in the solder comes into contact with the ceramic body and reduces the ceramic body when the ceramic element is fixed and connected to a printed circuit board or the like by soldering the external electrode.

The protective layer preferably contains a silicon oxide as the insulating oxide. This will allow the protective layer to more effectively control plating spread and plating adhesion. The protective layer will even more preferably contain at least 9 $\mu g/cm^2$ silicon. This will result in a protective layer that is thick enough to even more effectively control plating spread and plating adhesion.

The element zinc is preferably included in the elements forming the ceramic layer, and the second layer preferably contains the element zinc. This will allow the protective layer to more effectively control plating spread and plating adhesion.

The present invention makes it possible to provide a ceramic element in which plating spread and plating adhesion are controlled, so that external electrode shorts are less likely to occur. The protective layer is also less likely to become detached from the ceramic element of the present invention, and the flux contained in the solder is therefore less likely to come into contact with the ceramic body during reflow. It is therefore possible to prevent the surface insulating resistance of the ceramic body from being diminished by the reducing action of flux.

DESCRIPTION OF THE PREFERRED EMBODIMENTS

Preferred embodiments for working the invention are illustrated in detail below with reference to the figures as needed. However, the invention is not limited to the following embodiments. Parts that are the same in the figures will be indicated by the same symbol, and will not be re-explained. The dimensional scale in the figures is also not limited to the scale shown in the figures.

Figure 1:
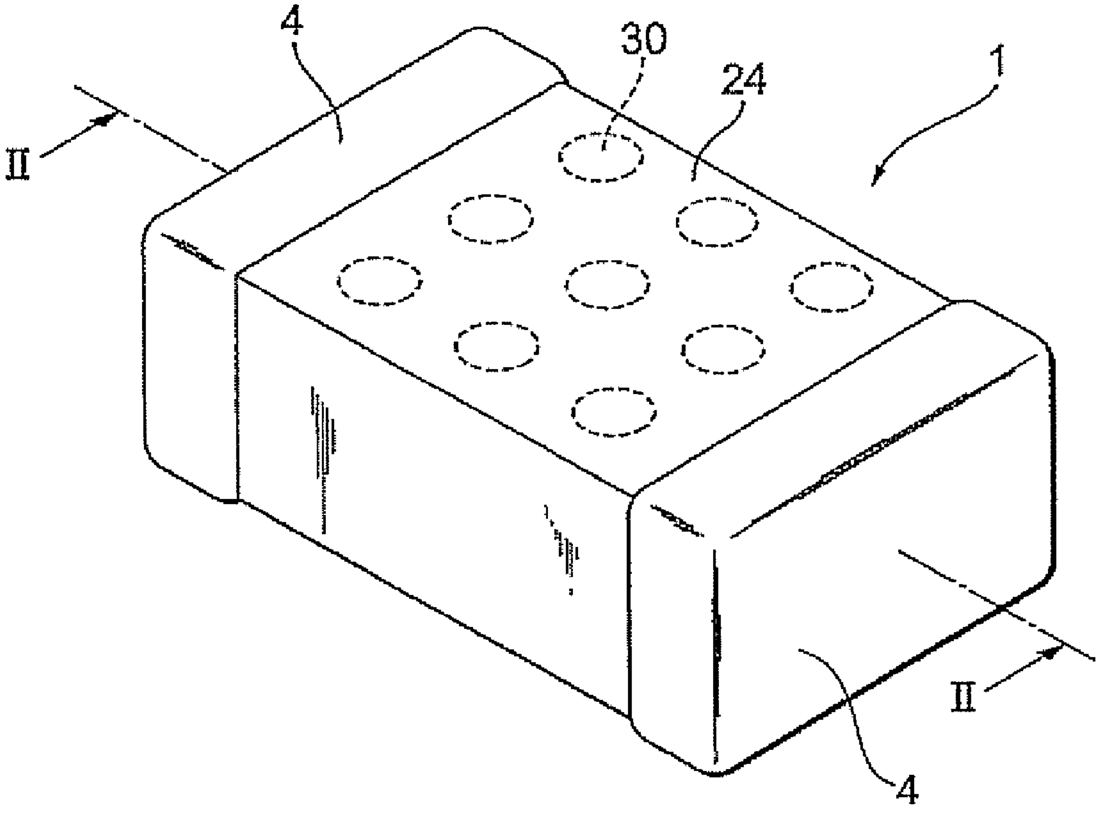
FIG. 1 is a perspective view of a ceramic element according to one embodiment.
Figure 2:
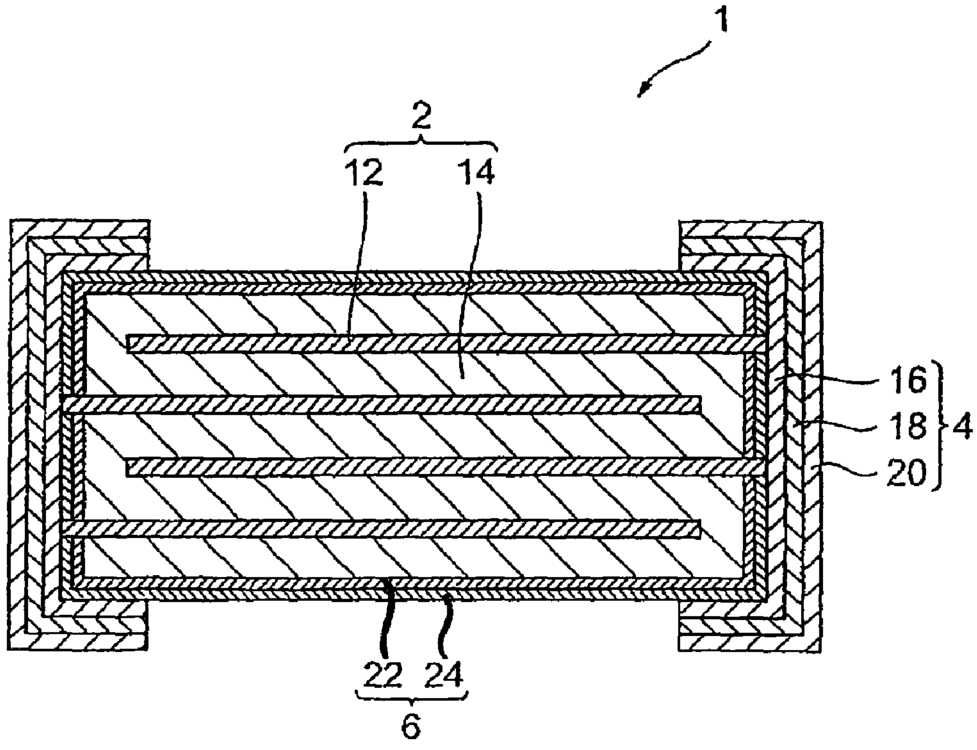
FIG. 2 is a cross-sectional view of the ceramic element in FIG. 1 along line II-II.

FIG. 1 is a perspective view of a ceramic element according to one embodiment. FIG. 2 is a cross-sectional view of the ceramic element in FIG. 1 along line II-II. The ceramic element 1 shown in FIGS. 1 and 2 is composed of a ceramic body 2 in the form of a rectangular solid, an external electrode 4 having a base electrode 16 which is provided on the outside of the ceramic body 2 and having plating layers 18 and 20 covering the outside surface of the base electrode 16, and a protective layer 6 covering the outer surface of the ceramic body 2.

The ceramic body 2 has an internal electrode layer 12 and a ceramic layer 14. The internal electrode 12 is composed, for example, of a silver-palladium alloy. The ceramic layer 14 has semiconductor properties or magnetic properties, and is composed of a metal oxide such as zinc oxide. The ceramic body 2 is preferably composed of four alternately stacked layers each of internal electrode layers 12 and ceramic layers 14.

The external electrode 4 has a base electrode 16 and plating layers covering the outside surface of the base electrode 16. The base electrode 16 is provided on the outside of the ceramic body 2 so as to be electrically connected to the internal electrode 12. The base electrode 16 is, for example, an Ag electrode. The plating layers covering the outer surface of the base electrode 16 are a first plating layer 18 and a second plating layer 20. The first plating layer 18 and second plating layer 20 are formed, in that order, from the inside. The first plating layer 18 is, for example, an Ni plating layer, and the second plating layer 20 is, for example, an Sn plating layer.

The protective layer 6 covers nearly the entire outer surface of the ceramic body 2. However, one end of each of the internal electrodes 12 penetrates through the protective layer 6 and is exposed outside of the protective layer 6. The protective layer 6 includes a first layer 22 and a second layer 24.

The first layer 22 is an insulating layer containing an insulating oxide. The insulating oxide forming the first layer 22 is at least one, for example, selected from the group consisting of $SiO_2$, $Al_2O_3$, $TiO_2$, $ZrO_2$, and MgO. The second layer 24 includes the same oxide as the oxide forming the first layer 22 and the same element as the element forming the ceramic layer 14. The ceramic layer 14 and second layer 24 preferably contain the element zinc, and the ceramic layer 14 and second layer 24 preferably contain zinc oxide in particular.

The first layer 22 and second layer 24 preferably contain a silicon oxide (SiOx) such as silicon dioxide ($SiO_2$) in order to more effectively prevent plating spread or plating adhesion. At such times, the protective layer 6 will preferably include at least 9 $\mu g/cm^2$ silicon (Si) to adequately prevent plating spread and plating adhesion. On the other hand, the silicon content is preferably less than 106 $\mu g/cm^2$, more preferably less than 67 $\mu g/cm^2$, and even more preferably less than 40 $\mu g/cm^2$. A silicon content of 106 $\mu g/cm^2$ or more will tend to result in a protective layer 6 that is too thick, making it more difficult for the internal electrode 12 to penetrate through the protective layer 6 and connect to the base electrode 16 due to thermal expansion during the formation of the base electrode.

The areas 30 surrounded by the dashed lines in FIG. 1 relate to a measuring method in the examples described below.

Figure 3:
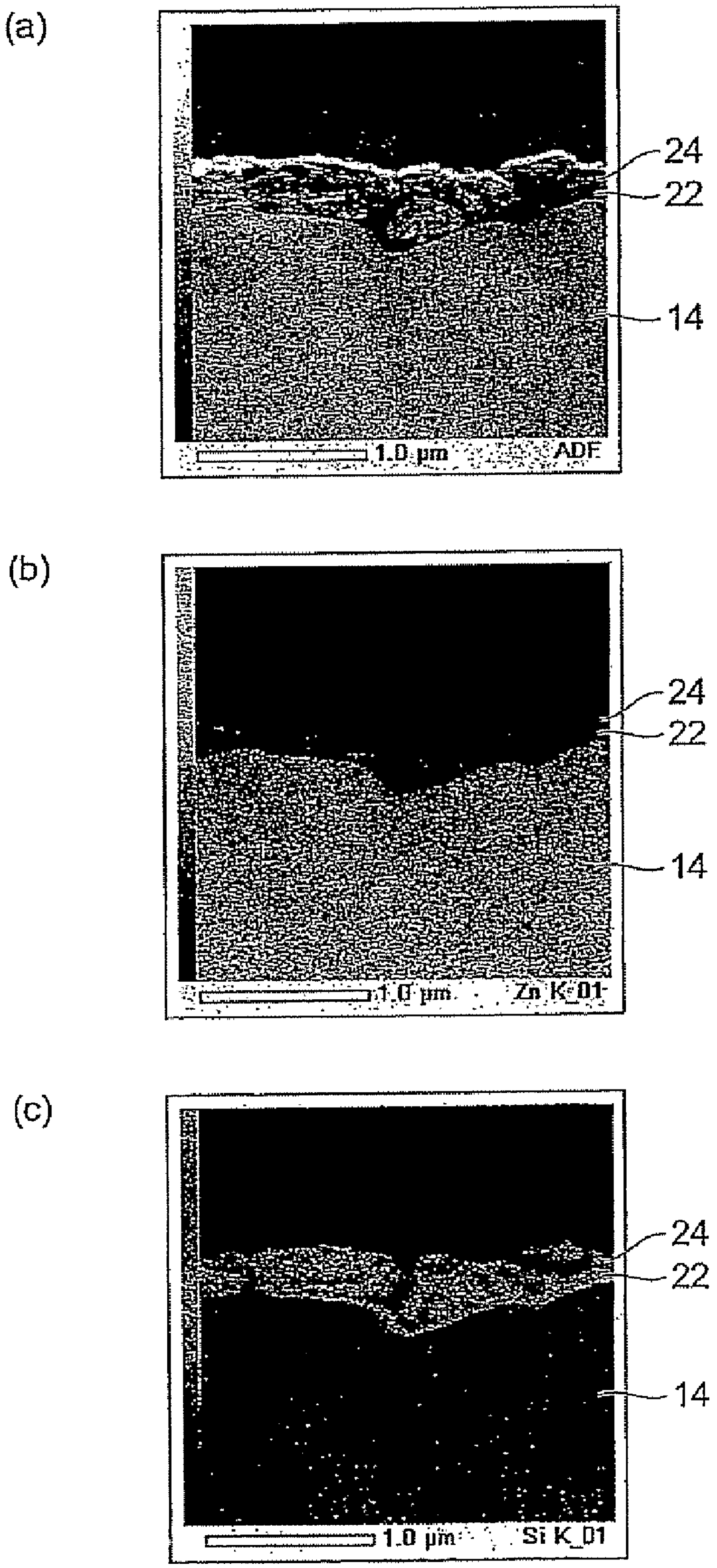
FIG. 3 provides STEM-EDS maps showing the two-layered structure of a protective layer in a ceramic element according to one embodiment.

FIG. 3 provides cross sectional STEM-EDS maps of the ceramic element (varistor element) according to one embodiment. FIG. 3 shows an example of a varistor element in which the element forming the ceramic layer 14 is the element zinc, and the insulating oxide forming the first layer 22 is silicon oxide. (a) of FIG. 3 is a TEM image, (b) of FIG. 3 is an image showing the distribution of Zn, and (c) of FIG. 3 is an image showing the distribution of Si. As shown in (a) of FIG. 3, the protective layer 6 covering the outer surface of the ceramic layer 14 has a two-layered structure composed of the first layer 22 and the second layer 24. Based on (b) of FIG. 3, the ceramic layer 14 and second layer 24 were confirmed to contain Zn, and based on (c) of FIG. 3, the first layer 22 and second layer 24 were confirmed to contain Si. That is, the second layer 24 contained both silicon oxide and the element zinc.

An example of a method for forming the protective layer having the two-layered structure such as in this embodiment is sputtering with a barrel rotary RF (high frequency) sputtering equipment using the oxide forming the first layer as the target. The number of barrel rotations, ceramic body input, sputtering time, and the like can be suitably adjusted to form a protective layer having a two-layered structure. For example, a protective layer having a two-layered structure will be more readily formed with a higher number of barrel rotations, greater ceramic body input, and a longer sputtering time.

Figure 4:
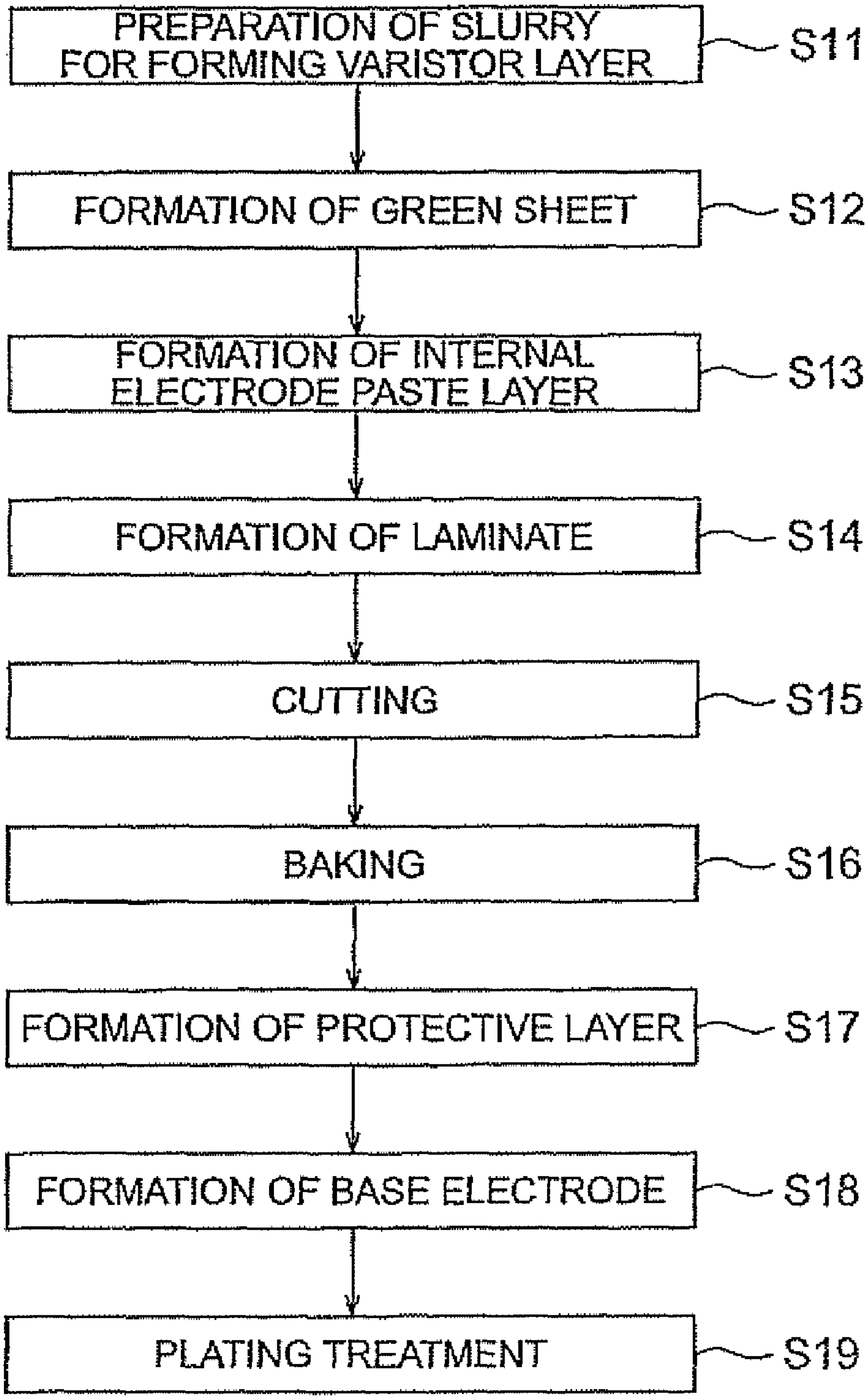
FIG. 4 is a flow chart showing a process for producing a ceramic element according to one embodiment.

The ceramic element 1 in this embodiment can be suitably formed by the following procedure, for example. FIG. 4 is a flow chart showing a preferred process for producing the ceramic element 1.

Step 11 (S11): Preparation of Slurry for Forming Ceramic Layer

A mixture of zinc oxide (ZnO) as the primary component, and of cobalt (Co) and praseodymium (Pr), etc. as auxiliary components, was prepared. Organic binder, organic solvent, organic plasticizer, and the like added to the resulting mixture to produce a slurry. The resulting slurry is the "slurry for forming the ceramic layer."

Step 12 (S12): Formation of Green Sheet

The slurry for forming the ceramic layer which was obtained in S11 is then applied by a well known method such as the use of a doctor blade onto a base film such as polyethylene terephthalate (PET). The ceramic layer-forming slurry that has been applied is dried to form a film about 30 μm thick on the base film. The resulting film is peeled off the base film, giving a sheet (referred to below as a "green sheet").

Step 13 (S13): Formation of Internal Electrode Paste Layer

An organic binder or the like is added to and mixed with a metallic powder such as a silver-palladium alloy (Ag—Pd alloy), giving a paste (referred to below as "paste"). The resulting paste is printed by screen printing or the like onto the green sheet obtained in S12 and is then dried. A desired pattern (referred to below as "internal electrode paste layer") consisting of the above paste is thus formed on the green sheet.

Step 14 (S14): Formation of Laminate

Several (in this case, four) green sheets on which the internal electrode paste layer was formed in S13 are prepared. These are laminated in such a way that the green sheets and internal electrode paste layers are alternately arranged. Green sheets on which no internal electrode paste layers have been formed are also laminated so as to cover the exposed internal electrode paste layers, and all the layers are compressed to form a laminate.

Step 15 (S15): Cutting

The laminate obtained in S14 is cut into a rectangular solid of the desired size. The resulting cut rectangular solids are referred to as "green chips."

Step 16 (S16): Baking

The green chips obtained in S15 are heated for about 0.5 to 24 hours at 180 to 400° C. to eliminate the binder or solvent (debindering). After the debindering step, the green chips are further baked for about 0.5 to 8 hours at 1000 to 1400° C. to form the internal electrode layers 12 from the internal electrode paste layer in the green chips and to form the ceramic layers 14 from the green sheets. This results in a ceramic body 2 composed of alternately laminated internal electrode layers 12 and ceramic layers 14.

Step 17 (S17): Formation of Protective Layer

The ceramic body 2 obtained in S16 is then introduced into a barrel rotary RF (high frequency) sputtering equipment for sputtering using $SiO_2$ as the target. Sputtering is preferably carried out at 20 rpm using, for example, a barrel rotary RF sputtering equipment with a barrel diameter of 200 mm and a depth of 200 mm. This type of sputtering will form the protective layer 6 on the surface of the ceramic body 2.

Step 18 (S18): Formation of Base Electrode

The metallic paste material containing the silver (Ag) is applied to both opposing end faces of the ceramic body 2 on which the protective layer 6 has been formed, as obtained in S17, and the paste is then heat treated (baked) at about 550 to 850° C. This will form the base electrode 16 at both opposing end faces of the ceramic body 2. The internal electrode layers 12 which have become expanded as a result of the heating poke through the protective layer 6, allowing the base electrode 16 to become connected to the internal electrode layer 12.

Step 19 (S19): Plating

The first plating layer 18 and second plating layer 20 are formed, in that order, by electroplating on the surface of the base electrode 16 formed in S18. The first plating layer 18 is, for example, preferably a nickel (Ni) plating layer, and the second plating layer 20 is, for example, a stannum (Sn) plating layer. This will result in an external electrode 4 in which the first plating layer 18 and second plating layer 20 are formed on the base electrode 16.

The varistor 1 in this embodiment is obtained by the above steps S11 through 19. However, the order of S17 and S18 may be reversed. In that case, a step for removing the protective layer formed on the surface of the base electrode is required before S19.

EXAMPLE

Examples are given below to illustrate the invention in greater detail. However, the invention is not limited to the following examples.

A size 1608 (about 1.6 mm×about 0.8 mm×about 0.8 mm) varistor body was produced through Steps S11 through 16 above. The resulting varistor body was a ceramic body having a ceramic layer formed from zinc oxide.

Example 1

2000 of the resulting varistor bodies were introduced into a barrel (barrel diameter 200 mm and depth 200 mm) rotary RF sputtering equipment, and sputtering was carried out for a treatment time of 1.5 hours at 20 barrel rpm using $SiO_2$ as the target, thereby forming a protective layer on the surfaces of the varistor bodies.

A metallic paste material containing silver (Ag) was applied to both opposing end faces of the varistor body on which the protective layer had been formed, and the paste was then baked at about 550 to 850° C., forming a base electrode. The outer surface of the base electrode was plated with nickel and then with stannum. This resulted in a varistor in which a protective layer, base electrode, and plating layers had been formed on the varistor body.

Example 2

Varistors were obtained in the same manner as in Example 1 except that 25,000 varistor bodies were introduced into the barrel rotary RF sputtering equipment, and the treatment time was 5 hours.

Comparative Example 1

A protective layer based on $SiO_2$ was formed by laser ablation on the surface of a varistor body. A varistor was then obtained by forming the base electrode and plating layers in the same manner as in Example 1.

Investigation of Protective Layer

Analysis by STEM-EDS mapping of the structure of the protective layers in the varistors produced above revealed that two-layered structures composed of a first layer containing a silicon oxide and a second layer based on a silicon oxide and containing the element zinc had been formed in the examples. In the comparative example, on the other hand, a single-layered protective layer containing a silicon oxide was formed.

Plating Spread and Plating Adhesion

The appearance of the varistors obtained in Examples 1 and 2 and Comparative Example 1 was observed, where "plating spread" was defined as the spread of a plating layer 20 μm out of the area where the base electrode was to be formed, and "plating adhesion" was defined as the adhesion of plating more than 20 μm in diameter on the varistor body surface other than the portion where the base electrode was formed. The results revealed virtually no plating spread or plating adhesion in the varistors obtained in Examples 1 and 2, whereas more plating spread and plating adhesion were found in the varistor obtained in Comparative Example 1.

Silicon Content

In the varistors obtained in Examples 1 and 2 and Comparative Example 1, the silicon content of the plated protective layer was analyzed by X-ray fluorescence analysis (XRF) (five samples each, 9 locations per sample, at a measuring diameter of 50 μm). In FIG, 1, the 9 measuring locations are shown by the areas 30 surrounded by dashed lines. As shown in Table 1, the Si content of the protective layer in Examples 1 and 2 was at least 9 $\mu g/cm^2$, whereas the Si content of the protective layer in Comparative Example 1 was less than 9 $\mu g/cm^2$. Here, a greater Si content indicates that a sufficiently thick protective layer had been formed.

TABLE 1

| | Si content ($\mu g/cm^2$) |
|---|---|
| Example 1 | 9-19.4 |
| Example 2 | 16.5-23.4 |
| Comparative Example 1 | 6.2-8.6 |

Changes in Insulation Resistance

Figure 5:
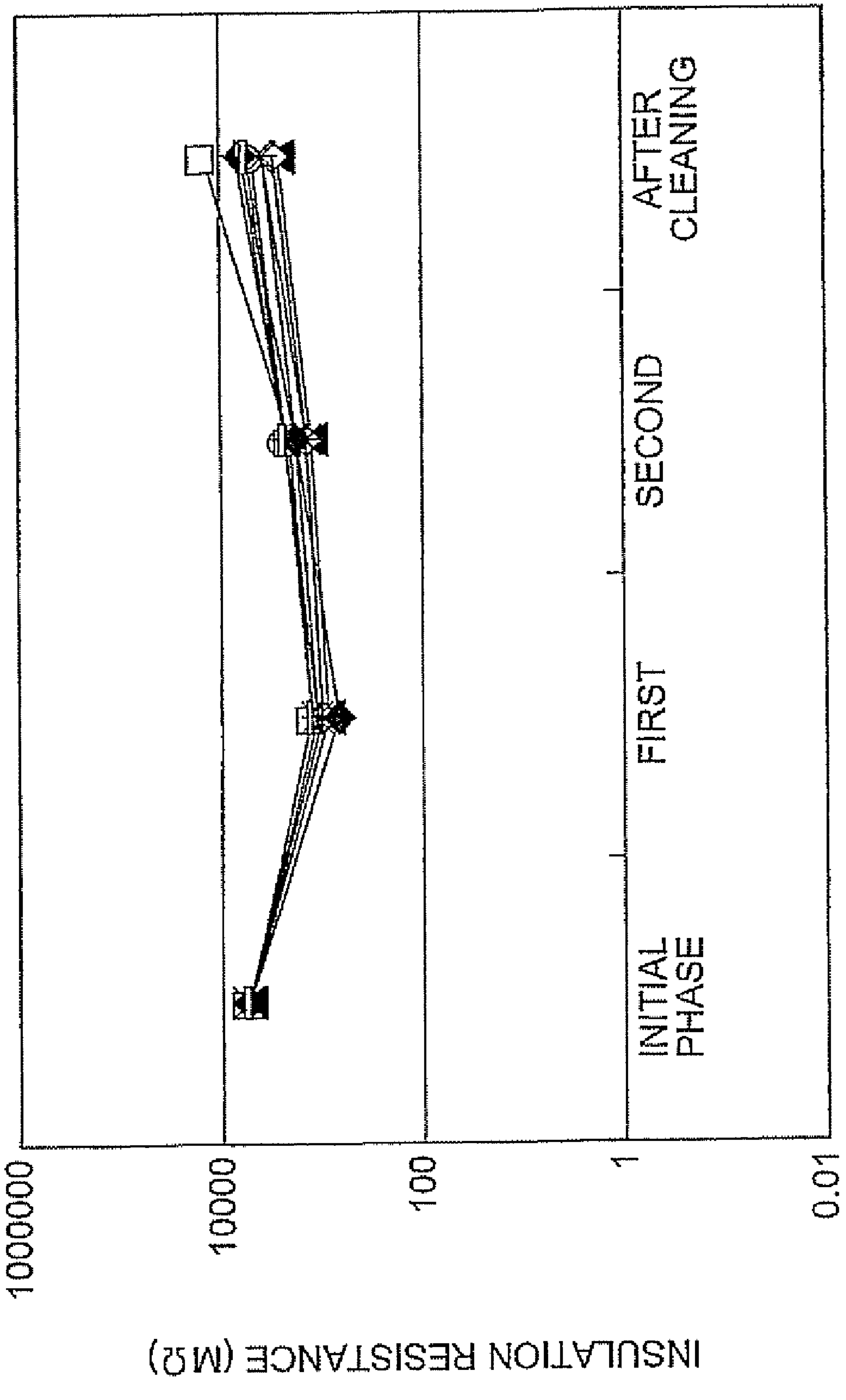
FIG. 5 is a graph showing reflow-induced changes in the insulation resistance of a ceramic element produced in an example.
Figure 6:
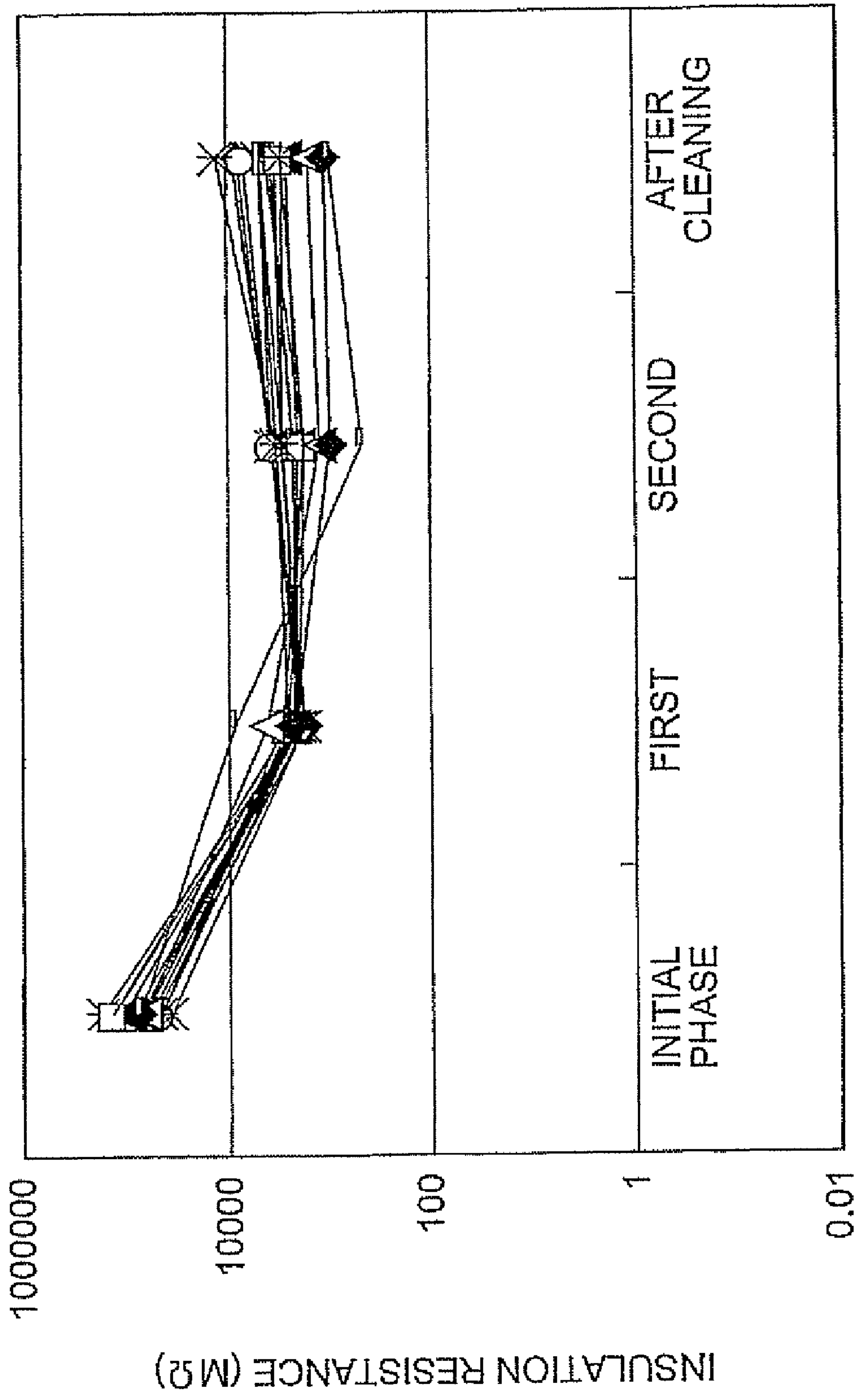
FIG. 6 is a graph showing reflow-induced changes in the insulation resistance of a ceramic element produced in an example.

The varistors obtained in Examples 1 and 2 were mounted by reflow on printed circuit boards. The insulation resistance of the varistor elements was determined after reflow mounting (initial phase), after the first post-mounting reflow thermal hysteresis, after the second reflow thermal hysteresis, and after cleaning to study the changes in insulation resistance as a result of reflow mounting. The results for Examples 1 and 2 are given in the graphs of FIGS. 5 and 6. Several samples were measured, with the results for 9 samples given in FIG. 5 and for 14 samples in FIG. 6. As shown in the graphs, virtually no change in insulation resistance due to reflow was found in the varistor elements obtained in Examples 1 and 2, and the varistor element surface resistance did not decrease appreciably. That is, no reduction of the varistors due to solder flux was found. It was therefore apparent that the protective layer in the varistors obtained in Examples 1 and 2 was less likely to become detached, and that solder flux could be adequately prevented from coming into contact with the varistor body during reflow.

No plating spread or plating adhesion will be found in ceramic elements such as varistors, thermistors, and inductors provided by the present invention, and shorts will therefore be less likely to occur, even in smaller elements. They are thus suitable for use as electronic components mounted on printed circuit boards.

What is claimed is:

1. A ceramic element, comprising:

a ceramic body having an internal electrode layer and a ceramic layer;

an external electrode having a base electrode which is provided on an outside of the ceramic body so as to be electrically connected with the internal electrode layer, and a plating layer covering the base electrode; and a protective layer for covering at least a portion of the ceramic layer other than the portion covered by the external electrode, wherein the protective layer comprises a first layer that is an insulating layer containing an insulating oxide, and a second layer that is an insulating layer containing the same insulating oxide as the first layer and an element that is the same as at least one of elements forming the ceramic layer, and the first layer and the second layer are sequentially formed over the surface of the ceramic body.

2. The ceramic element according to claim 1, wherein the protective layer contains at least 9 μg/$cm^2$ silicon.

3. A ceramic element, comprising:

a ceramic body having an internal electrode layer and a ceramic layer;

an external electrode having a base electrode which is provided on an outside of the ceramic body so as to be electrically connected with the internal electrode layer, and a plating layer covering the base electrode; and a protective layer for covering at least a portion of the ceramic layer other than the portion covered by the external electrode, wherein the protective layer comprises a first layer that is an insulating layer containing an insulating oxide, and a second layer that is an insulating layer containing the same insulating oxide as the first layer and an element that is the same as at least one of elements forming the ceramic layer, the insulating oxide forming the first layer is at least one compound selected from the group consisting of a silicon oxide, $Al_2O_3$, $TiO_2$, $ZrO_2$ and MgO, an element zinc is included in the elements forming the ceramic layer, and the second layer contains the element zinc, and the first layer and the second layer are sequentially formed in that order over the surface of the ceramic body.

4. The ceramic element according to claim 3, wherein the protective layer contains at least 9 μg/$cm^2$ silicon.

* * * * *